US 8,233,374 B2

(12) United States Patent
Ishikawa et al.

(10) Patent No.: US 8,233,374 B2
(45) Date of Patent: Jul. 31, 2012

(54) MULTILAYER OPTICAL DISC

(75) Inventors: Yoshinori Ishikawa, Yokohama (JP);
Koji Mishima, Tokyo (JP); Tsutomu Aoyama, Tokyo (JP); Takashi Kikukawa, Tokyo (JP)

(73) Assignees: Hitachi Consumer Electronics Co., Ltd., Tokyo (JP); TDK Corporation, Tokyo (JP)

( * ) Notice: Subject to any disclaimer, the term of this patent is extended or adjusted under 35 U.S.C. 154(b) by 0 days.

(21) Appl. No.: 12/600,580

(22) PCT Filed: May 15, 2008

(86) PCT No.: PCT/JP2008/058923
§ 371 (c)(1),
(2), (4) Date: May 4, 2010

(87) PCT Pub. No.: WO2008/143125
PCT Pub. Date: Nov. 27, 2008

(65) Prior Publication Data
US 2010/0260026 A1 Oct. 14, 2010

(30) Foreign Application Priority Data
May 17, 2007 (JP) .................................. 2007-131852

(51) Int. Cl.
*G11B 3/74* (2006.01)
(52) U.S. Cl. .................................... 369/275.1; 428/64.1
(58) Field of Classification Search ................ 369/94, 369/112.01, 112.05, 284, 275.1; 428/64.1
See application file for complete search history.

(56) References Cited

U.S. PATENT DOCUMENTS

| 2005/0036432 A1* | 2/2005 | Kim et al. ............... 369/112.16 |
| 2005/0201260 A1 | 9/2005 | Kawaguchi et al. |
| 2007/0253306 A1* | 11/2007 | Takahashi et al. ............ 369/94 |
| 2009/0046558 A1 | 2/2009 | Ohkubo |

FOREIGN PATENT DOCUMENTS

| JP | 2000-113507 A | 4/2000 |
| JP | 2004-318938 | 11/2004 |
| JP | 2006-351120 | 12/2006 |
| WO | WO 2007/040038 | 4/2007 |

OTHER PUBLICATIONS

Mishima, K., et al., "150 GB, 6-Layer Write Once Disc for Blu-ray Disc System", ODS Technical Digest, 2006, pp. 123-125, IEEE.
Extended European Search Report, issued in European Patent Application No. 08752783, dated Sep. 1, 2011.

* cited by examiner

*Primary Examiner* — Hoa T Nguyen
*Assistant Examiner* — Andrew Sasinowski
(74) *Attorney, Agent, or Firm* — McDermott Will & Emery LLP

(57) ABSTRACT

In a multi-layer optical disc, having three (3) or more recording layers thereof, for enabling an easy focus lead-in operation onto a desired recording layer, reflectivity of respective recording layers are so determined that a ratio between the reflectivity of the desired recording layer and the reflectivity of other recording layers is equal or greater than a predetermined value, upon basis of the reflectivity of the other recording layers.

20 Claims, 4 Drawing Sheets

MULTILAYER OPTICAL DISC

RELATED APPLICATIONS

This application is the U.S. National Phase under 35 U.S.C. §371 of International Application No. PCT/JP2008/058923, filed on May 15, 2008, which in turn claims the benefit of Japanese Application No. 2007-131852, filed on May 17, 2007, the disclosures of which Applications are incorporated by reference herein.

FIELD OF THE INVENTION

The present invention relates to a multi-layer disc having three (3) or more of recording layers.

BACKGROUND OF THE INVENTION

As a method for increasing the recording capacity of an optical disc, it is already known to minimize a laser spot by shortening the wavelength of a laser beam for conducting recording/reproducing of data and by increasing NA of an objective lens for recording/reproducing of data, or to multiple the recording layer into a plural number thereof. As such the multi-layer disc, a dual-layer disc is already put into practical use thereof, in the field of a DVD and a Blu-ray Disc (hereinafter, being described as "BD"). Also, in recent years, an optical disc having three (3) or more recording layers thereof is proposed, and for example in the following Non-Patent Document 1 is proposed a BD having six (6) recording layers.

[Non-Patent Document 1] ODS 2006 Technical digest (2006) 041 (pp 123-125)

BRIEF SUMMARY OF THE INVENTION

Herein, consideration will be paid upon the recording layer, to which a focus lead-in operation should be done at first, on the multi-layer disc.

In a two-layers BD, a recording layer laying at a depth 100 μm from a disc surface, upon which is incident a laser beam for recording/reproducing of information, is called "L0" and a recording layer at a depth 75 μm "L1", and a BCA (Burst Cutting Area) code including DI (Disc Information), into which classification information or the like of the disc are recorded, is disposed on the recording layer "L0".

FIG. 2 attached shows an outlook view of an optical disc having the BCA therein.

In FIG. 2, at a center of an optical disc 201 is provided a center hole 202 for use of disc loading, and on the periphery of the center hole 202 is disposed the BCA 203. When conducting a focusing servo to the recording layer "L0" at a radius position of the BCA 203 while rotating the optical disc 201, a level of reflection light from the optical disc 201 becomes bar-code data repeating change of intensity (i.e., strong and weak). This bar-code data is the BCA code, i.e., including the DI therein.

However, at the radius position of the BCA, there is a possibility that spike noises due to the BCA are generated in the well-known waveform of "S" of a focus error (hereinafter, "FE") signal, and this brings about an error of timing of the focus lead-in operation. For that reason, it is common that an optical disc apparatus adopts a method therein, i.e., moving the objective lens to the radius position of the BCA, after conducting the focus lead-in operation at the radius position where no BCA lies, once, and reproducing the BCA data.

For the purpose of reading out the BCA code, it is enough to conduct only the focusing servo, but the tracking servo is not necessary. The optical disc apparatus, although determining the classification of the medium for the optical disc loaded, i.e., to which it corresponds to, such as, among BD-ROM, BD-R, etc., for example, with using a level of reflection signal or the like; however, a final determination of the classification of the medium is done by referring to the DI, which is recorded in the BCA of the optical disc 201 in advance. For deciding the classification of the medium in short time-period, since it is necessary to conduct the focus lead-in operation onto the recording layer, on which the BCA 203 recording the DI therein is disposed, then in particular, in case of the 2-layers BD, it is preferable for the optical disc apparatus to conduct the focus lead-in operation, at first, onto the recording layer "L0" where the BCA lies, i.e., the information to be reproduced at first.

Regarding a 6-layers BD, although not being determined to which layer the BCA should be disposed since no specification is established for that yet, but by taking the description of the Non-Patent Document 1 mentioned above into the consideration, following the conventional technologies up to now, in particular, for the 6-layers BD, it can be prospected that the BCA or the like corresponding to that may be disposed on the deepest layer, i.e., "L0". In that instance, for the optical disc apparatus of supporting the 6-layers BD thereon, it is preferable to conducting the focus lead-in operation onto the deepest recording layer "L0", at first.

The object of the present invention is to provide a multi-layer optical disc, having three (3) or more of recording layers, for enabling an easy focus lead-in operation onto the recording layer, on which the information to be reproduced first is recorded.

The object of the present invention can be accomplished, as an example thereof, by establishing a predetermined relationship between the reflectivity of the recording layer, on which the information to be reproduced first is recorded, and the reflectivity of other recording layers.

EFFECT OF THE INVENTION

According to the present invention, it is possible to provide a multi-layer optical disc, having three (3) or more of recording layers, for enabling an easy focus lead-in operation onto the recording layer, on which the information to be reproduced first is recorded.

BEST MODE FOR CARRYING OUT THE PRESENT INVENTION

Embodiment 1

Hereinafter, embodiments according to the present invention will be fully explained.

On the multi-layer optical disc, it is already known that a spherical aberration is generated due to the difference in distances, from between a disc surface, upon which a laser beam is incident for conducting recording/reproducing of information, up to each of recording surfaces, and for that reason, a "S"-shaped signal, i.e., the FE signal differs in the amplitude thereof, on each of the recording layers. For example, if determining a compensation value of spherical aberration in such a manner that it comes to be optimal on the recording layer "L0", then the amplitude of the FE signal on the recording layer "L0" comes to be larger than the amplitude of the FE signal on other layers. Also, on the recording layer "L1", since the compensation value of spherical aberration is shifted from the optimal value thereof, the amplitude of the FE signal on the recording layer "L1" comes to be smaller than the amplitude of the FE signal on the recording layer "L0". Hereinafter, in the similar manner, the amplitude of the FE signal comes to be smaller as it is apart from the recording layer "L0", e.g., in the order "L2", "L3", "L4" and "L5", for example.

Figure 3:
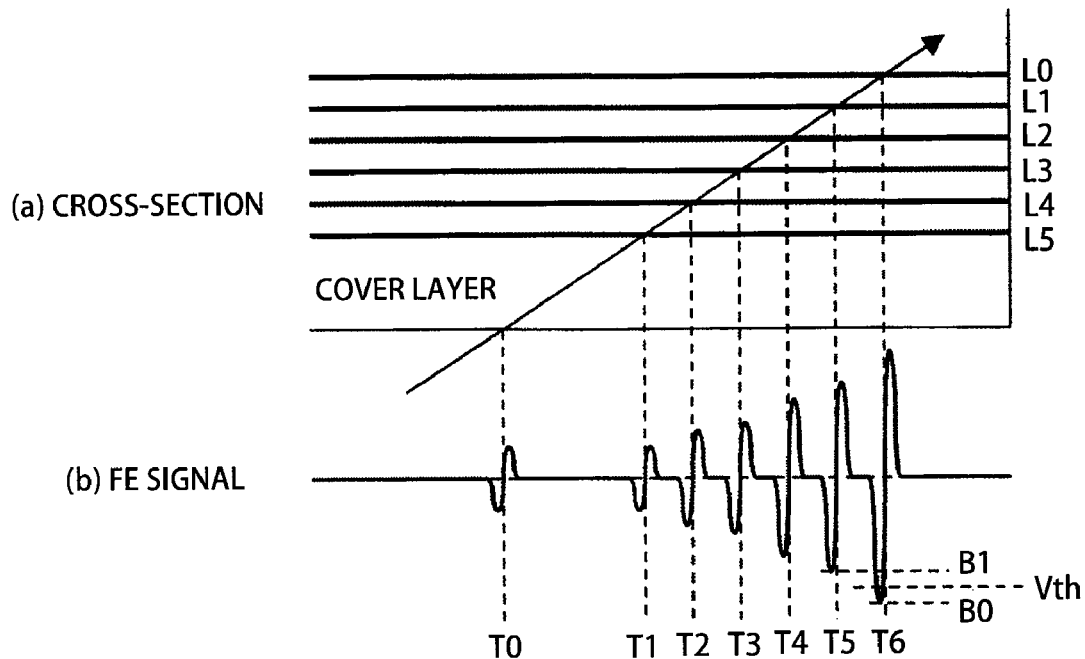
FIG. 3 is a view for showing the waveform of a focus error signal when rising up an objective lens.

Herein, explanation will be made about the operation of a focus lead-in and a signal waveform, on a 6-layers BD, by referring to FIG. 3 attached. In FIG. 3, it is assumed that a spherical aberration compensating mechanism equipped in the optical disc apparatus is compensated so as to be optimal to the recording layer "L0" in advance.

"(a)" in FIG. 3 shows the cross-section of the 6-layers BD, and an arrow in the figure shows a locus of a laser spot when operating an objective lens to go up, upon conducting the focus lead-in operation thereof. Also, "(b)" in FIG. 3 shows a schematic of a FE signal, on which a "0" crossing "S"-shaped signal appears at time "T0" when the laser spot comes across the surface of the disc. When continuing rise-up of the objective lens further, the "0" crossing "S"-shaped signal appears at time "T1" when the laser spot comes across the recording layer "L5", and thereafter, the "S"-shaped signal also appears at every time "T2", "T3", "T4", "T5" and "T6" when the laser spot comes across the recording layer "L4", "L3", "L2", "L1" and "L0", respectively.

Accordingly, for the purpose of conducting the focus lead-in onto the recording layer "L0", correctly, with provision of detection level "Vth" between the bottom levels "B1" and "B0" of each FE signal, upon the recording layers "L1" and "L0", as is shown in FIG. 3, a focus lead-in control circuit, which is installed in the optical disc apparatus, is able to apply a method of closing a focus servo loop at a timing "T6" when the FE signal comes across "0" after the FE signal comes to be equal or lower than the detection level "Vth".

For applying the method mentioned above therein, it is necessary that the amplitude of FE signal is largest on the recording layer "L0", upon which the BCA is disposed. However, the amplitude of FE signal is changed due to the reflectivity on each recording layer and/or a compensation error of the spherical aberration compensation, and this brings about a problem that the bottom level "B1" of the FE signal on other recording layer comes to be equal or lower than the detection level "Vth", or that the bottom level "B0" of the amplitude of FE signal on the recording layer "L0" does not come to be equal or lower than the detection level "Vth". Then, for dissolving such a problem, it is necessary to provide an optical disc, upon which the amplitude of FE signal comes up to the largest on the recording layer "L0".

Hereinafter, explanation will be made about the embodiment 1 according to the present invention, in more details thereof.

Figure 1:
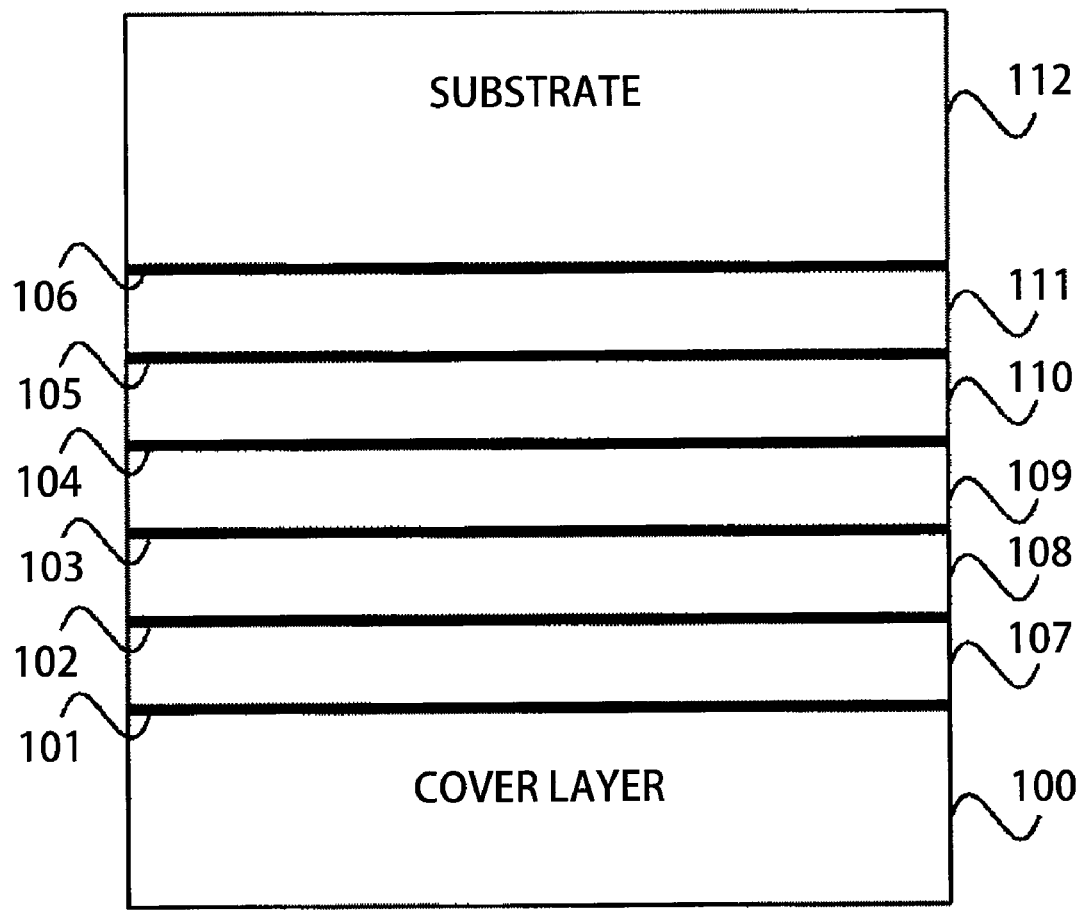
FIG. 1 is an enlarge cross-section view of a 6-layer optical disc, according to an embodiment of the present invention.
Figure 2:
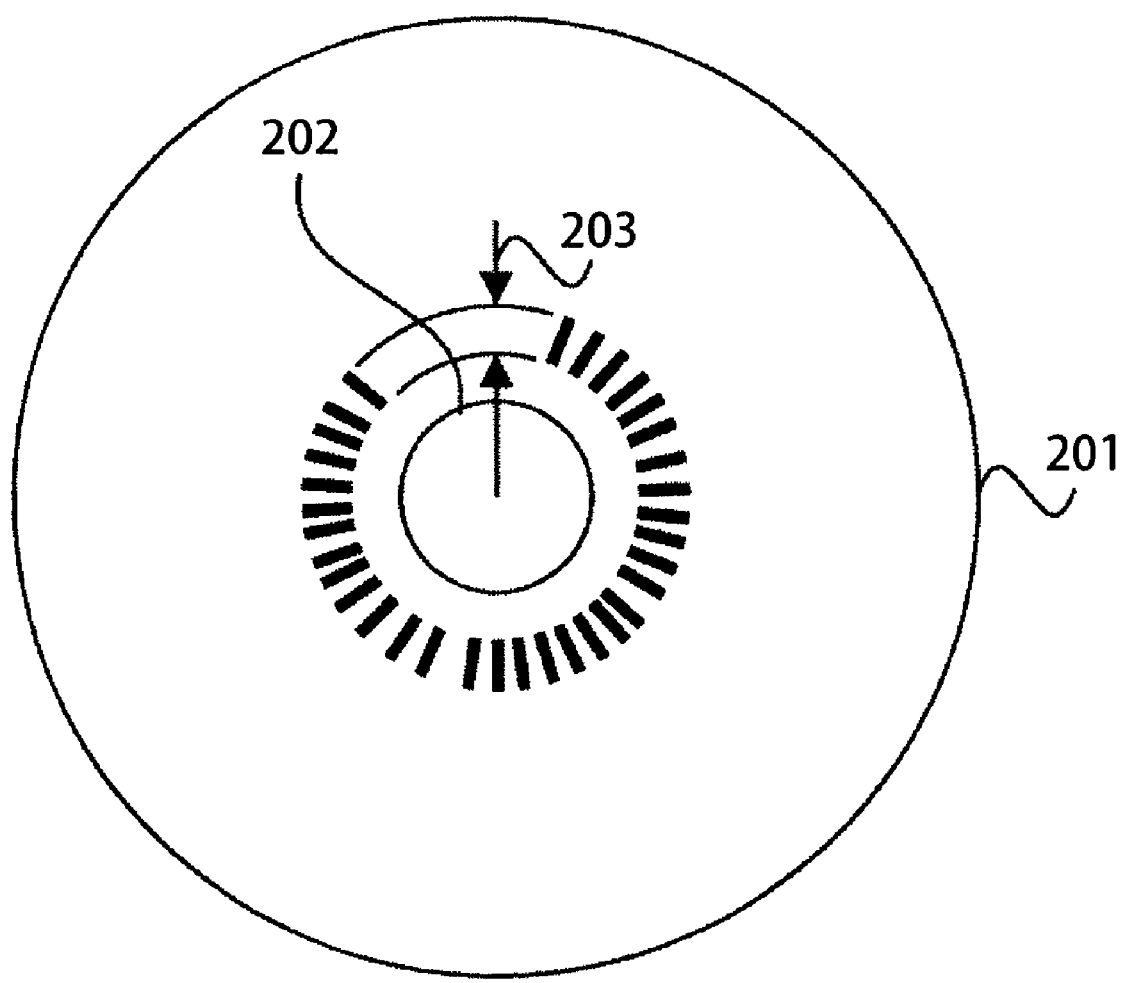
FIG. 2 is an outlook view of the optical disc having the BCA thereon.

FIG. 1 is a cross-section view of a 6-layers optical disc, according to the embodiment 1 of the present invention.

A reference numeral 100 depicts a cover layer having thickness of 40 µm, and is made of a transparent resin or the like.

Reference numerals 101 to 106 depict the recording layers "L5", "L4", "L3", "L2", "L1" and "L0", respectively. However, each recording layer has a stacking structure of using a phase-change material or an organic material therein, but since that the materials don't constitute the essential to the present invention, then the explanation thereof will be omitted herein.

Reference numerals 107 to 111 depict space layers. Each space layer is made of a transparent resin or the like. Also, each space layer is assumed to have a thickness of 15 µm. A reference numeral 112 depicts a substrate, and is made of polycarbonate, etc. Also, the thickness of the entire optical disc, including those from the cover layer 100 to the substrate 112, is 1.2 mm. Also, the laser beam for conducting the recording/reproducing of information is incident or entered thereupon from the side of the cover layer 100.

The characteristic of the multi-layer optical disc, according to the embodiment 1, lies in that the reflectivity of the recording layer "L0" (see a reference numeral 106) is higher, comparing to that of other recording layers.

When a number is "n" of the number of the recording layers of the multi-layer optical disc, if assuming that the recording layer is "L0" at the deepest with respect to a data readout surface, the recording layer is "Ln−1" at the most front, and the reflectivity and the transmittance are "r" and "t", in an individual recording layer of each of recording layer Li (i=0, 1, . . . , n−1), respectively, then, in general, the reflectivity "R" of each recording layer in the stacked state to a laser beam entering from the data readout surface can be expressed by the following equation:

$$R_i = \left( \prod_{k=i+1}^{n-1} t_k \right)^2 \cdot r_i \qquad (\text{Eq. 1})$$

From the (Eq. 1), the reflectivity $R_0, R_1, R_2, R_3, R_4$ or $R_5$ of each layer, from the recording layer "L0" to "L5" of the 6-layers optical disc shown in FIG. 1, can be expressed as below:

$$R_0 = (t_1 \cdot t_2 \cdot t_3 \cdot t_4 \cdot t_5)^2 \cdot r_0 \qquad (\text{Eq. 2})$$

$$R_1 = (t_2 \cdot t_3 \cdot t_4 \cdot t_5)^2 \cdot r_1 \qquad (\text{Eq. 3})$$

$$R_2 = (t_3 \cdot t_4 \cdot t_5)^2 \cdot r_2 \qquad (\text{Eq. 4})$$

$$R_3 = (t_4 \cdot t_5)^2 \cdot r_3 \qquad (\text{Eq. 5})$$

$$R_4 = (t_5)^2 \cdot r_4 \qquad (\text{Eq. 6})$$

$$R_5 = r_5 \qquad (\text{Eq. 7})$$

Herein, if consideration is paid upon the amplitude of FE signal, it is already known, in general, that the amplitude of FE signal is proportional to the reflectivity of the recording layer. With this fact, if bringing the reflectivity "$R_0$" of the recording layer "L0" to be higher, comparing to the reflectivity "$R_1$", "$R_2$", "$R_3$", "$R_4$" and "$R_5$" of other recording layers, it is possible to heighten the amplitude of FE signal on the recording layer "L0" to be higher than the amplitude of FE signals on other layers, under the condition that a compensation value of spherical aberration is adjusted, appropriately, with respect to the layer "L0".

For heightening the reflectivity "$R_0$" of the recording layer "L0", from the (Eq. 2), it can be seen that it is sufficient to increase the transmittance "$t_1$", "$t_2$", "$t_3$", "$t_4$" and "$t_5$" of the recording layers from "L1" to "L5", or increase the reflectivity "$R_0$" of the recording layer "L0". However, as can be seen from the (Eq. 3) to (Eq. 6), in case when changing the transmittance "$t_2$", "$t_3$", "$t_4$" and "$t_5$", this also gives influences upon the reflectivity "$R_1$", "$R_2$", "$R_3$" and "$R_4$". Also, if changing the transmittance "$t_1$" of the recording layer "L1", since this gives an ill influence upon the reflectivity "$r_1$" of the recording layer "L1", therefore this gives an influence upon the reflectivity "$R_1$" of the recording layer "L1". Therefore, for increasing the reflectivity "$R_0$" of the recording layer "L0", but without giving the influences upon the other recording layers, it is preferable to increase the reflectivity "$r_0$" of the recording layer "L0".

Hereinafter, explanation will be given on an effect when increasing the reflectivity "$R_0$" of the recording layer "L0", in particular, when it is at 110% with respect to the reflectivity of the other recording layers, for example, by referring to FIG. 4 attached.

Figure 4:
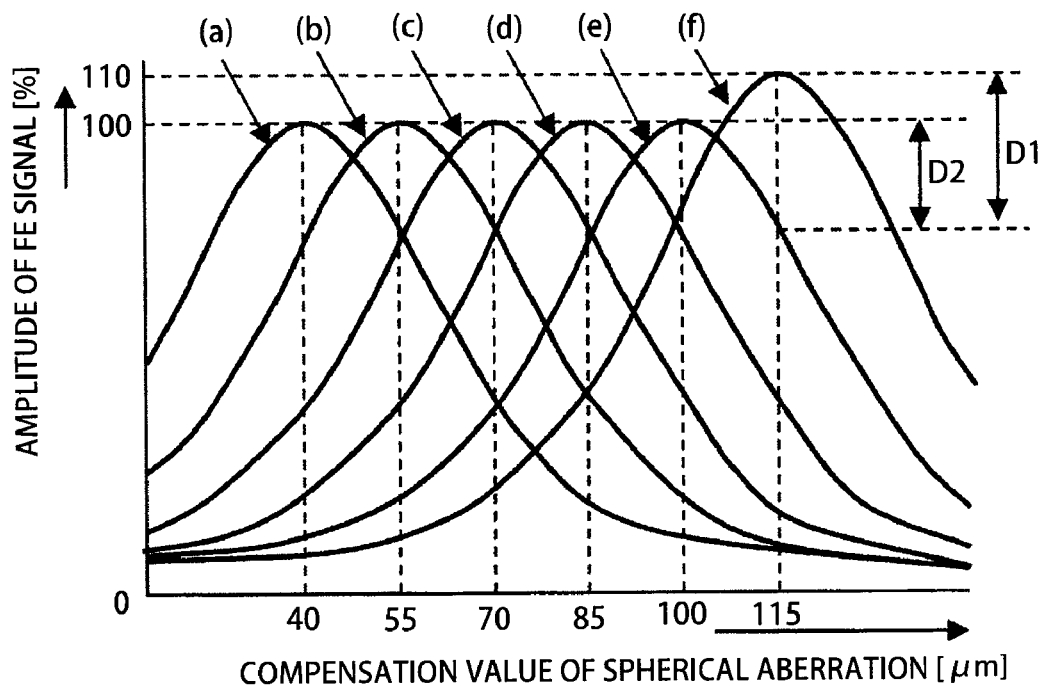
FIG. 4 is a view for showing a relationship between a compensation value of spherical aberration and amplitude of each of the focus error signals, in the present embodiment 1.

FIG. 4 is a graph for showing a relationship between a compensation value of spherical aberration and the amplitude of FE signal on each recording layer.

A curve (a) in FIG. 4 is obtained by plotting the amplitude of FE signal on the recording layer "L5", while changing the compensation value of spherical aberration. Since the distance from the disc surface to the recording layer "L5" is 40 μm, then the compensation value of spherical aberration has an optimal value at 40 μm, and at that time, the amplitude of FE signal comes up to the maximum. In the similar manner, a curve (b) is obtained by plotting the amplitude of FE signal on the recording layer "L4", while changing the compensation value of spherical aberration. Since the distance from the disc surface to the recording layer "L4", including the cover layer 100 and the space layer 107 therein, is 55 μm, then the compensation value of spherical aberration has an optimal value at 55 μm, and at that time, the amplitude of FE signal comes up to the maximum. Hereinafter, in the similar manner, curves (c), (d), (e) and (f) are also obtained by plotting the amplitudes of FE signals on the recording layers "L3", "L2", "L1" and "L0", respectively, and the amplitudes of FE signals come up to the maximum when the compensation values of spherical aberration are equal to the distances between the disc surface and the respective recoding layers, 70 μm, 85 μm, 100 μm and 115 μm, respectively.

Herein, if assuming that the reflectivity "$R_1$", "$R_2$", "$R_3$", "$R_4$" and "$R_5$" of the recording layers from "L1" to "L5" are same, then the maximum value of the amplitude of FE signal on each recording layer is equal to one another. When normalizing the amplitudes of FE signals, upon basis that the amplitude of FE signal on the recording layer "L5" is 100%, for example, then the amplitudes of FE signals on the respective recording layers are as shown in FIG. 4.

In FIG. 4, when the compensation value of the spherical aberration is 115 μm, i.e., the optimal value, with respect to the recording layer "L0", difference of the amplitude between the FE signals on the recording layer "L0" and the recording layer "L1" corresponds to "D1" in FIG. 4. For that reason, level difference between the bottom levels "B1" and "B0" of the "S"-shaped waveforms of the FE signals shown in FIG. 3 corresponds to about a half (½) of the "D1" mentioned above.

Herein, the effect of the present embodiment will be compared with the case of not applying the present embodiment therein. As an example of the case of not applying the present embodiment therein, consideration will be given on the case where the reflectivity of the recording layer "L0" is set to be the same as that of the other recording layers. In this case, the maximum value of the amplitude of FE signal on the recording layer "L0" is 100%, i.e., being same to the maximum value of the amplitude of FE signal on the other recording layers. In this case, the difference of the amplitude between the FE signals on the recording layers "L0" and the "L1" corresponds to "D2" in FIG. 4.

As is apparent from FIG. 4, the difference "D1" of the amplitude of FE signal when applying the present embodiment comes to be larger than the difference "D2" of the amplitude of FE signal when not applying the present embodiment therein. This means that the level difference between the bottom levels "B1" and "B0" becomes large, then it is possible to enlarge a margin of the detection level "Vth" for each of the bottom levels "B0" and "B1". For this reason, even in case where the amplitude of FE signal changes due to an error of the reflectivity between the recording layers "L0" and "L1" and/or an error of thickness of the space layer 111, the following phenomenon will happen; i.e., the bottom level "B0" of the "S"-shaped waveform of FE signal shown in FIG. 3 exceeds the detection level "Vth", or that the bottom level "B1" falls below the detection level "Vth". Therefore, the "S"-shaped waveform of FE signal upon the recording layer "L0" can be detected, correctly, with the detection level "Vth", and then it is possible to carry out the focus lead-in operation to a desired recording layer "L0", correctly.

In the embodiment 1 of the present invention mentioned above, with determining the reflectivity of the recording layer "L0" to be higher than the reflectivity of other recording layers, the difference between the bottom levels of the "S"-shaped waveforms of the FE signals on the recording layer "L0" and the recording layer "L1" is enlarged. With this, the optical disc apparatus can detect the "S"-shaped waveform upon the recording layer "L0" at a target, correctly, and then is able to conduct the focus lead-in operation onto the recording layer "L0" at the target, correctly.

However, in the embodiment 1 mentioned above, the explanation was made on the structure, in which the BCA is disposed on the recording layer "L0", but there is no necessity of restricting the recording layer to "L0", on which the BCA should be disposed. For example, in case of the structure of disposing the BCA on the recording layer "L2", a target layer of focus lead-in operation is the recording layer "L2". In this case, if determining the reflectivity of the recording layer "L2" to be higher than the recording factors of other recording layers, it is possible to conduct the focus lead-in operation onto the recording layer "L2", correctly, in the manner similar to the operations mentioned above.

However, the explanation was made that the reflectivity of the recording layer "L0" is 110% with respect to the recording layers "L1" to "L5", in the embodiment 1 mentioned above, but the reflectivity of the recording layer "L0" should not be limited to 110%, and it may be a value, i.e., 100% or higher than 100%, such as, 105% for example.

Also, in the embodiment mentioned above, although proposing the method of heightening the reflectivity "$r_0$" of the unit of the recording layer "L0"; however, the reflectivity of the recording layer "L0" may be heightened with changing the transmission factors "$t_1$" to "$t_5$" of units of the respective recording layers, if the characteristics of the recording layers from "L1" to "L5" can be kept within a desired range.

Further, for dissolving the drawback in the focus lead-in operation, it is enough that the amplitude of FE signal on the recording layer "L0" comes to the largest comparing to the amplitude of the FE signals on the other recording layers, and then it is needless to say that the reflectivity may be made small for each unit of the recording layers from "L1" to "L5".

However, if determining the reflectivity of the recording layer "L0" to be especially high, with respect to the recording layers from "L1" to "L5", for example 200%, then there is a possibility of generating a new problem; i.e., an input dynamic range of a photo detector within an optical pickup when trying to reproduce the recording layer "L0", or a reproducing condition must be set up, separately, when reading out information from the recording layer "L0". For that reason, it is preferable to determine an upper limit of a ratio of reflectivity of the recording layer "L0" to a predetermined value, such as, 120%, for example.

Embodiment 2

Although the explanation was given on the case of determining the reflectivity of the recording layer "L0", i.e., the target layer of focus lead-in operation, to be higher than the other recording layers; however, in an embodiment 2, explanation will be made on a multi-layer optical disc for enabling correct focus lead-in operation even in case where it is lower than the reflectivity of other recording layers.

The structure of the multi-layer optical disc of the embodiment 2 is similar to that shown in FIG. 1, which was explained in the embodiment 1, therefore the explanation thereof will be omitted herein.

Figure 5:
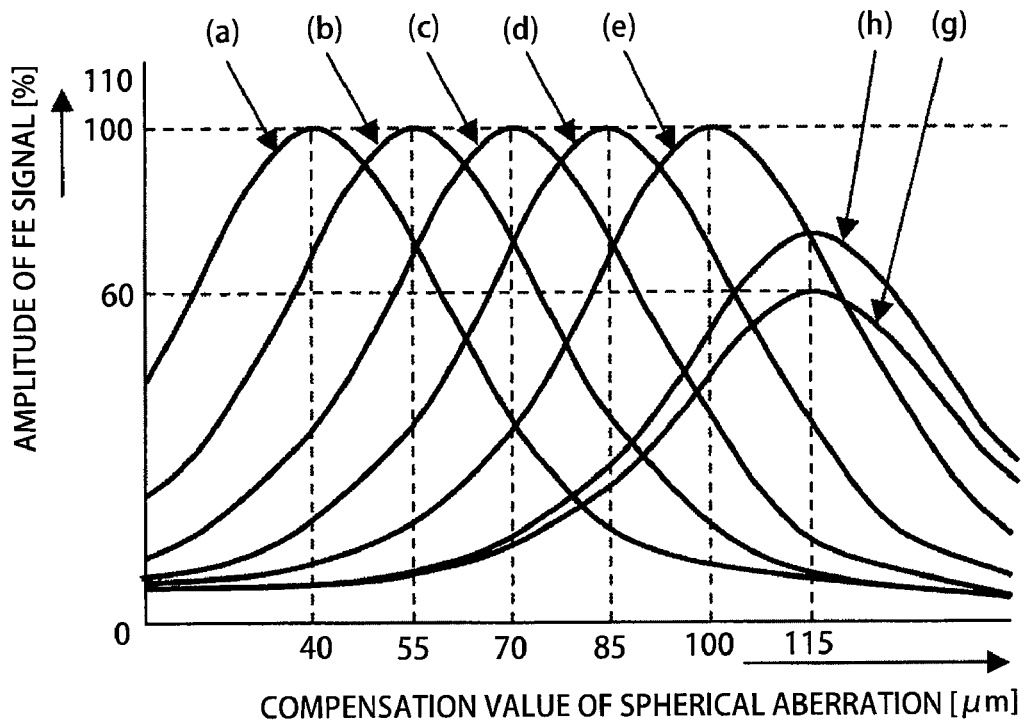
FIG. 5 is a view for showing a relationship between a compensation of spherical aberration and amplitude of each of the focus error signals, for explaining an embodiment 2 of the present invention.

FIG. 5 is a graph for showing the relationship between the compensation value of spherical aberration and the amplitude of FE signal on each recording layer, similar to FIG. 3. In the FIG. 5, a curve (g) is obtained by plotting the amplitudes of FE signals on the recording layer "L0" while changing the compensation value of spherical aberration, but it is assumed that the reflectivity on the recording layer "L0" is 60%, for example, being smaller that the reflectivity on the other recording layers.

As was explained previously, since the amplitude of FE signal is proportional to the reflectivity of the recording layer, then the amplitude of FE signal on the recording layer "L0" comes to be small, and if determining the compensation value of spherical aberration at 115 μm, i.e., to be optimal upon the recording layer "L0", but the maximum value thereof is 60% to the maximum value of the amplitude of FE signal on other recording layer.

Although sensitivity in changes of the amplitude of FE signal with respect to the compensation value of spherical aberration depends on the characteristics of an optical pickup equipped with the optical disc apparatus, but if the amplitude of FE signal upon the recording layer "L0" falls down to 60%, as is shown in FIG. 5, it is common that it comes to be smaller than the amplitude of FE signal upon the recording layer "L1".

As a condition for conducting the focus lead-in operation onto the recording layer "L0" correctly, the amplitude of FE signal upon the recording layer "L0" is larger than the amplitudes of FE signals on the recording layers from "L1" to "L5" under the condition that the compensation value of spherical aberration is set to be optimal to the recording layer "L0". Thus, as is shown by a curve (h) in FIG. 5, under the condition that the compensation value of spherical aberration is set at 115 μm, being optimal to the recording layer "L0", it can be said that the condition where the amplitudes of FE signals on the recording layer "L0" and the recording layer "L1" are equal to each other is a lower limit condition of the focus lead-in operation.

However, actually, by taking fluctuation of the reflectivity on each recording layer and fluctuation of adjustment of the compensation value of spherical aberration, and further a necessity of maintaining an interchangeability between recording/reproducing, of the optical pickups, which are designed variously, within the optical disc apparatus, within optical disc apparatuses, etc., into the consideration, it is preferable that the reflectivity of the recording layer "L0" is 80% or greater than that, comparing to the reflectivity of other recording layers.

Thus, if the recording layer "L0" is 80% or greater than that, comparing to the reflectivity of other recording layers, it is possible to maintain a necessary lowest margin of the detection level "Vth", for the bottom levels "B1" and "B0" of the "S"-shaped focus signal shown in FIG. 3. With this, it is possible to conduct the focus lead-in operation onto a desired recording layer "L0", correctly, with detecting only the "S"-shaped waveform upon the recording layer "L0".

As was mentioned above, according to the embodiment 2 of the present invention, with determining the reflectivity of the desired recording layer "L0", to which the focus lead-in operation should be conducted at first, to be equal or greater than a predetermined value, which is smaller than the reflectivity of other recording layers, the amplitude of FE signal on the desired recording layer "L0" is made largest, under the condition of adjusting the compensation value of spherical aberration, appropriately, to the recording layer "L0". With doing that, the optical disc apparatus is able to conduct the focus lead-in operation, correctly, by detecting only the "S"-shaped waveform of the desired recording layer "L0".

However, in the embodiment 2, the upper limit of the reflectivity of the recording layer "L0" may be determined within 120%, for example, similar to the embodiment 1, with respect to the other recording layers.

Embodiment 3

Explanation will be made on an embodiment 3, by referring to FIG. 6.

However, since the structure of the multilayer optical disc according to the embodiment 3 are same to that shown in FIG. 1 explained in the embodiment 1, then the explanation thereof will be omitted herein.

Figure 6:
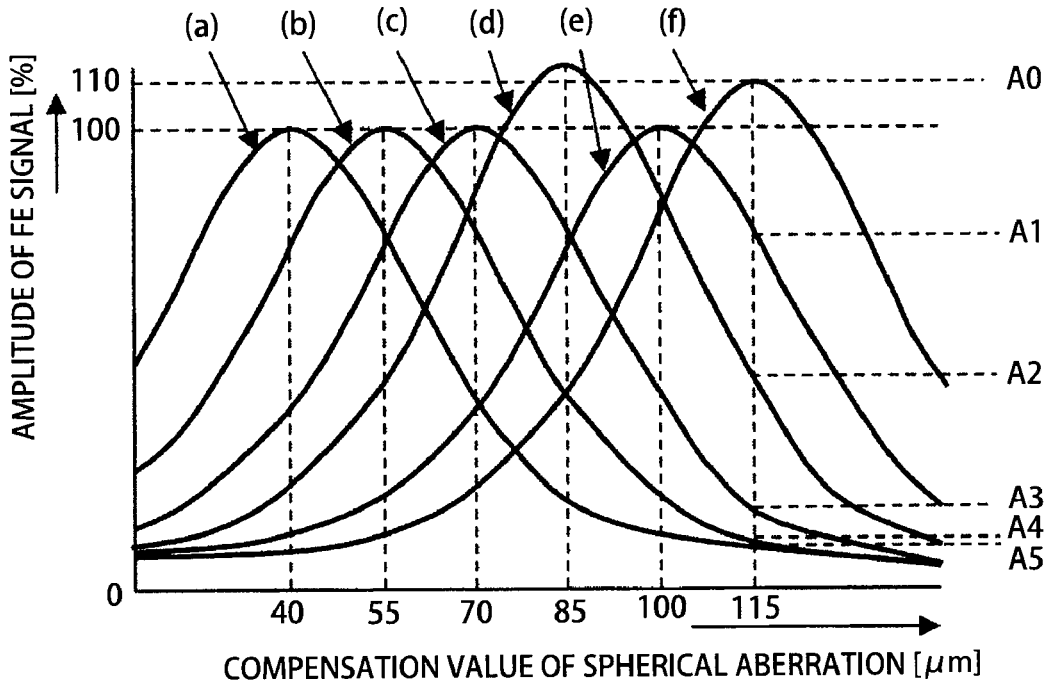
FIG. 6 is a view for showing a relationship between a compensation of spherical aberration and amplitude of each of the focus error signals, for explaining an embodiment 3 of the present invention.

FIG. 6 is a graph for showing the relationship between the compensation value of spherical aberration and the amplitude of FE signal of each recording layer, same as FIG. 4; but an aspect differing from that shown in FIG. 4, among from the recording layer "L1" to the recording layer "L5", only the reflectivity of the recording layer "L2" is higher, comparing to those of other recording layers, and further it is larger than the reflectivity of the recording layer "L0". As was mentioned above, since the amplitude of FE signal is proportional to the reflectivity of the recording layer, as is shown in FIG. 6, the maximum value of the amplitude of FE signal of the recording layer "L2" shown by a curve (d) is larger than the maximum value of the amplitude of FE signal of the recording layer "L0" shown by a curve (f).

On such multi-layer optical disc, under the condition that the compensation value of spherical aberration is adjusted, correctly, to the recording layer "L0", the levels of the amplitudes of FE signals on the recording layers from "L0" to "L5", when the laser spot passes each recording layer upon the focus lead-in operation, are levels "A0", "A1", "A2", "A3", "A4" and "A5", respectively, as shown in FIG. 6. Although the reflectivity of the recording layer "L2" is higher than the reflectivity of the recording layer "L0", but comparing them in the amplitude of FE signal, the level "A2" of the amplitude of FE signal on the recording layer "L2" is fully or sufficiently small, comparing to the amplitude "A0" of FE signal on the recording layer "L0". For that reason, during the operation of the focus lead-in, the bottom level of the "S"-shaped waveform of the recording layer "L2" will be never below the detection level "Vth". Also, it is apparent from FIG. 6, that the amplitudes "A3", "A4" and "A5" of the FE signals on other recording layers from "L3" to "L5" are sufficiently small, comparing to the amplitude "A0" of FE signal on the recording layer "L0".

From those, during the operation of focus lead-in, it is important that a sufficient level difference is in the amplitudes of each FE signal, between the recoding layer "L0" of target of drawing and the recording layer "L1" neighboring thereto, and it can be said that the amplitudes of FE signals on the recording layers from "L2" to "L5" do not matter, substantially.

From this fact, in order to conduct the focus lead-in operation correctly, the relationship between the recording layer "L0" and the recording layer "L1" neighboring thereto is determined, according to the embodiment 3.

Thus, on the multi-layer optical disc according to the embodiment 3, the reflectivity of the recording layer "L0" is determined to be high comparing to the reflectivity of the recording layer "L1". With this fact, similar to the embodiment 1, the level difference is enlarged between the bottom level "B0" of the "S"-shaped waveform on the recording layer "L0" and the bottom level "B1" of the "S"-shaped waveform on the recording layer "L1". With this, since the sufficient margin can be maintained between the detection level "Vth" and both the bottom levels, it is possible for the optical disc apparatus to conduct the focus lead-in operation, correctly, onto the recording layer "L0".

Also, even in case where the reflectivity on the recording layer "L0" is lower than the reflectivity on the recording layer "L1", with determining the reflectivity on the recording layer "L0" to be equal or higher than 80%, with respect to the reflectivity on the recording layer "L1", similar to the embodiment 2, it is possible to bring the amplitude of FE signal on the recording layer "L0" to be larger than the amplitude of FE signal on the recording layer "L1", under the condition that the compensation value of spherical aberration is adjusted correctly. With doing this, for the optical disc apparatus, it is possible to conduct the focus lead-in operation, correctly, onto the recording layer "L0".

However, in the embodiment 3, the upper limit of the reflectivity of the recording layer "L0" may be determined within 120%, for example, similar to the embodiments 1 and 2, with respect to the other recording layers.

On the multi-layer optical disc mentioned above, according to the embodiment 3, the relationship thereof is determined, between the reflectivity on the recording layer "L0" and the recording layer "L1", however no definition is established about the remaining four (4) recording layers, respect to the reflectivity of the recording layer "L0". For that reason, high flexibility can be obtained in designing, in particular, regarding the four (4) recording layers, as well as, a yield of the multi-layer optical disc can be increased.

However, the multi-layer optical disc shown as the embodiment 3 has the structure of disposing the BCA on the deepest layer "L0" from the incident surface of the laser beam, but it may also have a structure of disposing the BCA on the recording layer "L3", for example.

In this case, since the recording layer "L3" is the target layer of the focus lead-in operation, it is enough to establish the relationship between the reflectivity of the recording layer "L3" and the reflectivity of the recording layer "L4", as each of the reflectivity of the recording layer "L0" and the recording layer "L1" mentioned above. Thus, it is enough to define the relationship between the reflectivity of the target layer of focus lead-in operation and the reflectivity of the recording layer, which is disposed adjacent to on the side of the laser incident surface, on the contrary thereto.

Also, though (a) in FIG. 3 shows the waveform of the FE signal when rising up the objective lens, but as another method for the focus lead-in operation is also already known a method of the focus lead-in operation on the desired recording layer through descending operation of the objective lens after rising it up, once, until when the laser spot exceeds the target recording layer of the focus lead-in operation. In case of using this method, when conducting the focus lead-in operation onto the multi-layer optical disc, disposing the BCA on the recording layer "L3" thereof, the laser spot passes through the recording layer "L2" before passing through the recording layer "L3". For the purpose of providing a multi-layer optical disc for enabling the focus lead-in operation in such the case, it is enough to determine the relationship between the reflectivity of the recording layer "L3" and the reflectivity of the recording layer "L2" to be equal to that of each of the reflectivity of the recording layer "L0" and the recording layer "L1" mentioned above. Thus, it is enough to define the relationship between the reflectivity on the target layer of the focus lead-in operation, and on the contrary to that, the reflectivity of the recoding layer, which is disposed adjacent to on the side opposite to the laser incident surface.

In the embodiments 1 to 3 mentioned above, the thickness of the cover layer is 40 μm and the thickness of the individual space layer is 15 μm; however, those thicknesses should not restricted to the values mentioned above, but they may be determined, appropriately, so as to obtain the desired characteristics in the recording/reproducing properties of the disc.

Also, in the embodiments 1 to 3 was given the explanation on the 6-layers optical disc as the example thereof; however, it is needless to say that the present invention may be applied onto a multi-layer optical disc having three (3) or more layers thereof.

Moreover, although the explanation was made about the recording-type multi-layer optical disc, in the embodiments 1 to 3, however the present invention may be applied onto a reproducing-type multi-layer optical disc.

Further, in the embodiments 1 to 3, the explanation was given on the structure of including the classification information of the optical disc in the BCA code thereof, but it should not limited into the BCA if the classification information is included therein.

Also, in the embodiments 1 to 3, although the explanation was given on the recording-type optical disc, but there are sometimes cases where an already-recorded portion and a non-recorded portion are mixed within the same recording surface, and then the reflectivity differs depending on the recording condition thereof. For that reason, the reflectivity of the desired recording layer and the reflectivity of other recording layers may be determined to be equal to the reflectivity in the non-recorded portions thereof, respectively.

However, in the embodiments 1 to 3, although the reflectivity of the target layer in the focus lead-in operation is determined or defined upon basis of the reflectivity of the recording layers other than that target layer in the focus lead-in operation, but on the contrary to the above, it is needless to say that it is also same as the above even if defining the reflectivity of the other recording layers upon basis of the reflectivity of the target layer in the focus lead-in operation.

With the embodiments mentioned above, on the multi-layer optical disc having three (3) or more recording layers thereof, it is possible to conduct the focus lead-in operation onto the recording layer, on which the BCA is recorded, easily, and also to determine the classification of the optical disc, quickly.

EXPLANATION OF MARKS

100 . . . cover layer, 101, 102, 103, 104, 105 and 106 . . . recording layer, 107, 108, 109, 110 and 111 . . . space layer, 112 . . . substrate, 201 . . . optical disc, 202 . . . center hole, 203 . . . BCA

What is claimed is:

1. A multi-layer optical disc comprising:
three or more recording layers in a stacked state, wherein:
among stacked reflectivity of respective recording layers with respect to a laser beam for recording/reproducing information, a stacked reflectivity of a first recording layer, on which information to be reproduced first is recorded, is larger than the stacked reflectivity of the remaining two or more recording layers, and
the stacked reflectivity "$R_i$" of each recording layer in the stacked state to a laser beam entering from a data readout surface is expressed by the following equation:

$$R_i = \left( \prod_{k=i+1}^{n-1} t_k \right)^2 \cdot r_i,$$

wherein:
"n" indicates the number of the recording layers of the multi-layer optical disc, and
"$r_i$" and "$t_i$" indicate individual reflectivity and transmittance in each individual recording layer $L_i$ (i–0, 1, . . . , n–1), respectively.

2. The multi-layer optical disc, described in the claim 1, wherein
the stacked reflectivity of the first recording layer is equal or less than 120%, with respect to stacked reflectivity of said remaining two or more recording layers.

3. The multi-layer optical disc, described in the claim 1, wherein
said first recording layer is farthest from the data readout surface.

4. The multi-layer optical disc, described in the claim 1, wherein
said information to be reproduced first is included in Burst Cutting Area (BCA) data.

5. The multi-layer optical disc, described in the claim 1, wherein
the stacked reflectivity of said first recording layer and the stacked reflectivity of said remaining two or more recording layers are stacked reflectivities of non-recorded portions thereof.

6. A multi-layer optical disc comprising:
three or more recording layers in a stacked state, wherein:
among stacked reflectivity of respective recording layers with respect to a laser beam for recording/reproducing information, a ratio between stacked reflectivity of a first recording layer, on which information to be reproduced first is recorded, and stacked reflectivity of the remaining two or more recording layers is equal or greater than a predetermined value, based upon the stacked reflectivity of said remaining recording layers, the predetermined value being smaller than the stacked reflectivity of the remaining two or more recording layers, and
the stacked reflectivity "$R_i$" of each recording layer in the stacked state to a laser beam entering from a data readout surface is expressed by the following equation:

$$R_i = \left( \prod_{k=i+1}^{n-1} t_k \right)^2 \cdot r_i,$$

wherein:
"n" indicates the number of the recording layers of the multi-layer optical disc, and
"$r_i$" and "$t_i$" indicate individual reflectivity and transmittance in each individual recording layer $L_i$ (i–0, 1, . . . , n–1), respectively.

7. The multi-layer optical disc, described in the claim 6, wherein
said predetermined value is equal or greater than 0.8.

8. The multi-layer optical disc, described in the claim 6, wherein
the stacked reflectivity of the first recording layer is equal or less than 120%, with respect to stacked reflectivity of said remaining two or more recording layers.

9. The multi-layer optical disc, described in the claim 6, wherein
said first recording layer is farthest from the data readout surface.

10. The multi-layer optical disc, described in the claim 6, wherein
said information to be reproduced first is included in Burst Cutting Area (BCA) data.

11. The multi-layer optical disc, described in the claim 6, wherein
the stacked reflectivity of said first recording layer and the stacked reflectivity of said remaining two or more recording layers are stacked reflectivities of non-recorded portions thereof.

12. A multi-layer optical disc comprising:
three or more recording layers in a stacked state, wherein:
among stacked reflectivity of respective recording layers with respect to a laser beam for recording/reproducing information, a ratio between stacked reflectivity of a first recording layer, on which information to be reproduced first is recorded, and stacked reflectivity of the remaining recording layers neighboring said first recording layer is equal or greater than a predetermined value, based upon the stacked reflectivity of the remaining two or more recording layers, the predetermined value being smaller than the stacked reflectivity of the remaining two or more recording layers, and
the stacked reflectivity "$R_i$" of each recording layer in the stacked state to a laser beam entering from a data readout surface is expressed by the following equation:

$$R_i = \left( \prod_{k=i+1}^{n-1} t_k \right)^2 \cdot r_i,$$

wherein
"n" indicates the number of the recording layers of the multi-layer optical disc, and "$r_i$" and "$t_i$" indicate individual reflectivity and transmittance in each individual recording layer $L_i$ (i-0, 1, ..., n-1), respectively.

13. The multi-layer optical disc, described in the claim 12, wherein
said predetermined value is equal or greater than 0.8.

14. The multi-layer optical disc, described in the claim 12, wherein
said predetermined value is equal or greater than 1.0.

15. The multi-layer optical disc, described in the claim 12, wherein
said remaining two or more recording layers are disposed at positions nearer to an incident surface of said laser beam than the first recording layer.

16. The multi-layer optical disc, described in the claim 12, wherein
at least one of said remaining two or more recording layers is disposed at a position farther from an incident surface of said laser beam than the first recording layer.

17. The multi-layer optical disc, described in the claim 12, wherein
the stacked reflectivity of the first recording layer is equal or less than 120%, with respect to stacked reflectivity of said remaining two or more recording layers.

18. The multi-layer optical disc, described in the claim 12, wherein
said first recording layer is farthest from the data readout surface.

19. The multi-layer optical disc, described in the claim 12, wherein
said information to be reproduced first is included in Burst Cutting Area (BCA) data.

20. The multi-layer optical disc, described in the claim 12, wherein
the stacked reflectivity of said first recording layer and the stacked reflectivity of said remaining two or more recording layers are stacked reflectivities of non-recorded portions thereof.

* * * * *